US010427758B2

(12) United States Patent
Benoit et al.

(10) Patent No.: US 10,427,758 B2
(45) Date of Patent: Oct. 1, 2019

(54) MOORING LINE CONNECTOR ASSEMBLY FOR CONNECTING A MOORING LINE TO A FLOATING STRUCTURE

(71) Applicant: Single Buoy Moorings Inc., Marly (CH)

(72) Inventors: Jean Pierre Benoit, Monaco (FR); Benjamin Maurice Passieux, Monaco (FR)

(73) Assignee: SINGLE BUOY MOORINGS INC., Marly (CH)

( * ) Notice: Subject to any disclaimer, the term of this patent is extended or adjusted under 35 U.S.C. 154(b) by 0 days.

(21) Appl. No.: 15/573,053

(22) PCT Filed: May 11, 2016

(86) PCT No.: PCT/EP2016/060532
§ 371 (c)(1),
(2) Date: Nov. 9, 2017

(87) PCT Pub. No.: WO2016/180866
PCT Pub. Date: Nov. 17, 2016

(65) Prior Publication Data
US 2018/0118306 A1    May 3, 2018

(30) Foreign Application Priority Data
May 12, 2015   (EP) .................................... 15167400

(51) Int. Cl.
*B63B 21/50*    (2006.01)
*B63B 21/04*    (2006.01)
*F16B 1/04*    (2006.01)

(52) U.S. Cl.
CPC ............ *B63B 21/502* (2013.01); *B63B 21/04* (2013.01); *B63B 21/507* (2013.01); *F16B 1/04* (2013.01)

(58) Field of Classification Search
CPC ..... B63B 21/502; B63B 21/507; B63B 21/04; F16B 1/04
See application file for complete search history.

(56) References Cited

U.S. PATENT DOCUMENTS 4,943,188 A    7/1990 Peppel
6,409,428 B1    6/2002 Moog
(Continued)

FOREIGN PATENT DOCUMENTS

EP    2 154 059 A1    2/2010
EP    2 414 217 B1    4/2013
(Continued)

OTHER PUBLICATIONS

International Search Report, dated Aug. 4, 2016, from corresponding PCT/EP2016/060532 application.

*Primary Examiner* — Anthony D Wiest
(74) *Attorney, Agent, or Firm* — Young & Thompson

(57) ABSTRACT

Disclosed is a mooring line connector assembly for connecting a mooring line to a floating structure, including: a tubular housing connectable to the floating structure, having a lower housing end and an upper housing end with an inner circumference; a connector body extending along a connector axis, having an upper connector body end and a lower connector body end connected to the mooring line; a guiding body rotatably arranged on the connector body to be freely rotatable around the connector body and the connector axis, including first rotation unit on an outer surface of the guiding body and a guiding part having an outer circumference at an upper guiding body end; and second rotation unit arranged on an inner surface of the tubular housing, arranged for engaging the first rotation unit.

18 Claims, 6 Drawing Sheets

(56) References Cited

U.S. PATENT DOCUMENTS

| 8,683,935 B2 | 4/2014 | Bauduin et al. |
| 2006/0070741 A1 | 4/2006 | Pollack et al. |
| 2012/0031320 A1 | 2/2012 | Bauduin et al. |

FOREIGN PATENT DOCUMENTS

| FR | 2 791 316 A1 | 9/2000 |
| GB | 2 178 101 A | 2/1987 |
| WO | 2006/041904 A1 | 4/2006 |
| WO | 2010/112603 A1 | 10/2010 |
| WO | 2013/124717 A1 | 8/2013 |

MOORING LINE CONNECTOR ASSEMBLY FOR CONNECTING A MOORING LINE TO A FLOATING STRUCTURE

FIELD OF THE INVENTION

The invention relates to a mooring line connector assembly for connecting a mooring line to a floating structure, such as a vessel, in particular an offshore vessel with an internal or external turret mooring system, as well as a floating structure comprising one or more of such connector assemblies, as well as a method for connecting a mooring line to a floating structure.

BACKGROUND OF THE INVENTION

Such mooring line connector assemblies are known from, for instance, U.S. Pat. No. 8,683,935 B2, EP 2.414.217 A1 or equivalent patent publication WO 2010/112603 A1, EP 2.154.059 A1, WO 2013/124717 A1, U.S. Pat. No. 6,409,428 B1 or WO 2006/041904 A1.

WO 2010/112603 A1 describes a mooring leg connector for use with a mooring leg extending up from the sea floor to connect a floating structure to the seabed. Disconnection and connection of the mooring leg is done by pulling in and out a connector body extending in the mooring leg direction. The connector body is received in a housing which is fixed to the structure to be moored. A latch mechanism is provided with guiding means and orientation pins between the body of the connector and the housing to provide the connector body and the housing with the proper orientation with respect to each other for establishing the connection.

A disadvantage of the mooring leg connector of WO 2010/112603 A1 is that during connection the mooring leg exerts a so-called "restoring torque" on the latching mechanism, thereby hindering the connection operation, in particular proper rotational alignment of the connector body and the housing. Additionally, after connection a residual torque may be present in the mooring leg, which leads to a shorter operational life of the mooring leg and/or the mooring line connector assembly.

An object of the present invention is thus to provide a mooring line connector assembly, wherein the effects of the restoring torque on the connection process are eliminated or at least minimized.

Another object of the invention is to provide a mooring line connector assembly, wherein the operational life of the mooring line is improved.

SUMMARY OF THE INVENTION

Hereto, according to the invention, a mooring line connector assembly for connecting a mooring line to a floating structure is provided, comprising:
- a tubular housing connectable to the floating structure, having a lower housing end and an upper housing end with an inner circumference,
- a connector body extending along a connector axis, having an upper connector body end and a lower connector body end connected to the mooring line,
- a guiding body rotatably arranged on the connector body to be freely rotatable around the connector body and the connector axis, comprising first rotation means on an outer surface of the guiding body and a guiding part having an outer circumference at an upper guiding body end,
- second rotation means arranged on an inner surface of the tubular housing, arranged for engaging the first rotation means, wherein in a first disconnected state the first and second rotation means are disengaged and the inner and outer circumferences are configured to allow the outer circumference of the guiding part to be moved past the inner circumference along the connector axis in the direction of the floating structure to enter a second disconnected state, wherein the outer circumference of the guiding part is moved past the inner circumference along the connector axis in the direction of the floating structure, and the first and second rotation means engage each other and are configured to cause rotation of the guiding body with respect to the tubular housing and the connector body, around the connector axis, when an axial force is exerted on the guiding body, to enter a connected state, wherein the first and second rotation means are configured to be locked with respect to each other, and the inner and outer circumferences are configured to prevent the outer circumference of the guiding part to be moved past the inner circumference along the connector axis, in a direction away from the floating structure.

Due to the first rotation means, usually in the form of a cam, comprised by the guiding body, being freely rotatable around the connector body, and thus around the mooring line (or line, leg, et cetera), any torque exerted on the mooring line will be prevented from being transferred to the mooring line connector assembly, in particular the tubular housing thereof. At the same time, twisting of the mooring line around the connector axis is counteracted, leading to longer operational life of the chain links. Also, the "restoring torque" on the mooring line is prevented from interfering with the connection process, i.e. prevented from causing unwanted rotation of the first rotation means with respect to the second rotation means.

In the context of this patent application 'upper end' and 'lower end' are respectively used to indicate the end of the guiding body/connector body/mooring line, et cetera, facing the floating structure, and the seabed, respectively.

An embodiment relates to an aforementioned mooring line connector assembly, wherein the inner circumference comprises radially inwardly extending protrusions, and the outer circumference comprises radially outwardly extending protrusions, wherein in the first disconnected state the inwardly and outwardly extending protrusions are configured to be misaligned along the connector axis to allow the outwardly extending protrusions to be moved past the inwardly extending protrusions along the connector axis when an axial force is exerted on the guiding body in the direction of the floating structure, to enter the second disconnected state and in the connected state the inwardly and outwardly extending protrusions are configured to be aligned along the connector axis to prevent the outwardly extending protrusions to be moved past the inwardly extending protrusions along the connector axis when an axial force is exerted on the guiding body in a direction away from the floating structure. Thus, the inwardly and outwardly extending protrusions are conveniently used to transfer axial forces between the guiding body and the housing to moor the floating structure to the seabed.

An embodiment relates to an aforementioned mooring line connector assembly, wherein the inwardly and/or outwardly extending protrusions are evenly spaced-apart in circumferential direction along the inner circumference, respectively outer circumference to allow for an even force distribution from the inwardly extending protrusions to the outwardly extending protrusions (and vice versa) in the connected state.

An embodiment relates to an aforementioned mooring line connector assembly, wherein the amount of inwardly and/or outwardly extending protrusions is 4-8, preferably 6. Thus, accurate guidance can be achieved to guide the radially outwardly protrusions smoothly past the radially inwardly extending protrusions, towards the floating structure. The abovementioned amounts also prove to be optimal for creating a sufficiently large effective contact surface between the protrusions to absorb axial forces.

An embodiment relates to an aforementioned mooring line connector assembly, wherein the first rotation means comprise an outwardly protruding saw-tooth pattern and the second rotation means comprise one or more inwardly protruding orientation pins arranged for engaging the saw-tooth pattern, wherein in the second disconnected state the saw-tooth pattern is configured to allow the orientation pins to be moved into and out of the saw-tooth pattern along the connector axis, and to allow the orientation pins to rotate around the connector axis along the saw-tooth pattern when an axial force is exerted on the guiding body, and in the connected state the saw-tooth pattern is configured to lock the orientation pins, preventing the orientation pins from rotating along the saw-tooth pattern, and along the connector axis. Such a combination of a saw-tooth pattern and orientation pins is essentially known from the prior art, such as from U.S. Pat. No. 8,683,935 B2.

An embodiment relates to an aforementioned mooring line connector assembly, wherein the orientation pins are evenly spaced-apart along the tubular housing in circumferential direction to prevent one of the orientation pins from being asymmetrically loaded compared to the other orientation pins.

An embodiment relates to an aforementioned mooring line connector assembly, wherein the orientation pins comprise two groups of one or more radially opposing orientation pins to further assist with providing proper, symmetrical rotation of the housing with respect to the guiding body.

An embodiment relates to an aforementioned mooring line connector assembly, wherein each opposing group of orientation pins comprises two orientation pins spaced-apart along the connector axis, wherein the lower orientation pin is arranged for moving into, and for being locked in, the saw-tooth pattern. The upper orientation pin can be used for providing additional guidance along the inner surface of the housing, for example.

An embodiment relates to an aforementioned mooring line connector assembly, wherein the upper housing end is provided with a radially outwardly protruding flange for the guiding part to rest on in the connected state.

An embodiment relates to an aforementioned mooring line connector assembly, wherein the lower housing end is provided with a conical flange to facilitate entry of the guiding body and connector body into the tubular housing in the direction of the floating structure.

An embodiment relates to an aforementioned mooring line connector assembly, wherein a lower guiding body end is provided with a radial support body contacting the tubular housing to transfer radial mooring line forces to the tubular housing, in particular in the connected state.

An embodiment relates to an aforementioned mooring line connector assembly, wherein a pivoting arrangement is arranged at the lower connector body end, connected to the mooring line, the pivoting arrangement allowing a first relative rotation of the mooring line with respect to the lower connector body end around a first rotational axis perpendicular to the connector axis and a second relative rotation of the mooring line around a second rotational axis being perpendicular to the connector axis and the first rotational axis. Thus, due to the pivoting configuration, the respective rotational movements of the mooring line are prevented from being transformed into moments otherwise to be absorbed by the mooring line connector assembly.

Another aspect of the invention relates to a floating structure, comprising one or more of the aforementioned connector assemblies.

In particular, an aforementioned floating structure is provided, wherein the one or more connector assemblies are connected to a chain table of a buoy mooring system, such as an internal turret mooring system or an external turret mooring system.

Another aspect of the invention relates to a method for connecting a mooring line to a floating structure using the aforementioned mooring line connector assembly, comprising the steps of:

using a pull-in line connected to the upper end of the connector body to pull the connector body and the guiding body towards the floating structure through the tubular housing, in the axial direction, to enter the second disconnected state, wherein the first rotation means engage the second rotation means and the outer circumference of the guiding part is moved past the inner circumference, and using the pull-in line to exert an axial force on the guiding body to cause the first and second rotation means to rotate with respect to each other, until the first and second rotation means are locked with respect to each other, and the inner and outer circumferences are preventing the outer circumference of the guiding part to be moved past the inner circumference along the connector axis, in a direction away from the floating structure.

BRIEF DESCRIPTION OF THE DRAWINGS

Embodiments of a mooring line connector assembly according to the invention will by way of non-limiting example be described in detail with reference to the accompanying drawings. In the drawings.

DETAILED DESCRIPTION OF THE INVENTION

Figure 1:
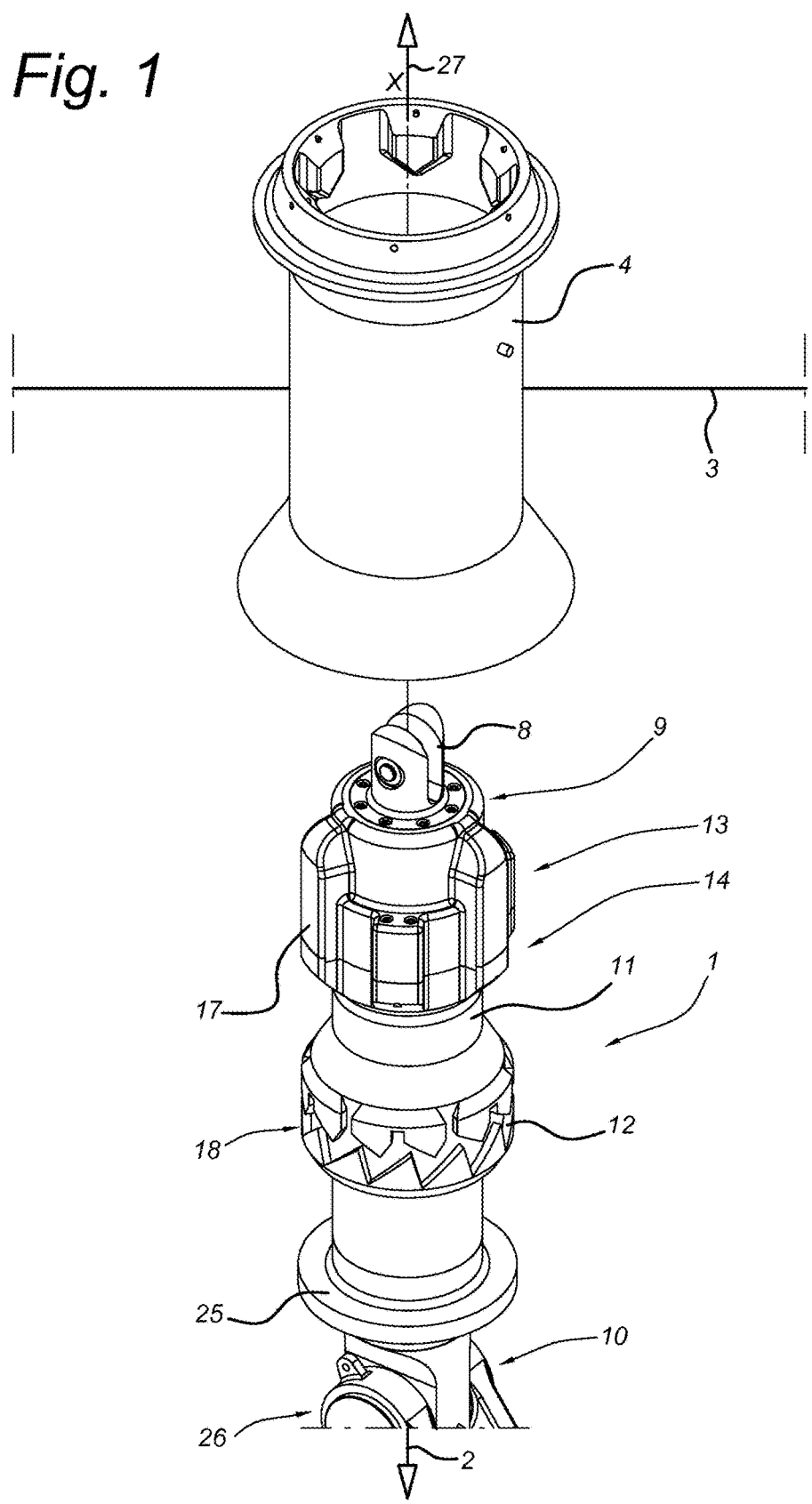
FIG. 1 shows a schematic perspective view of the guiding body.
Figure 2:
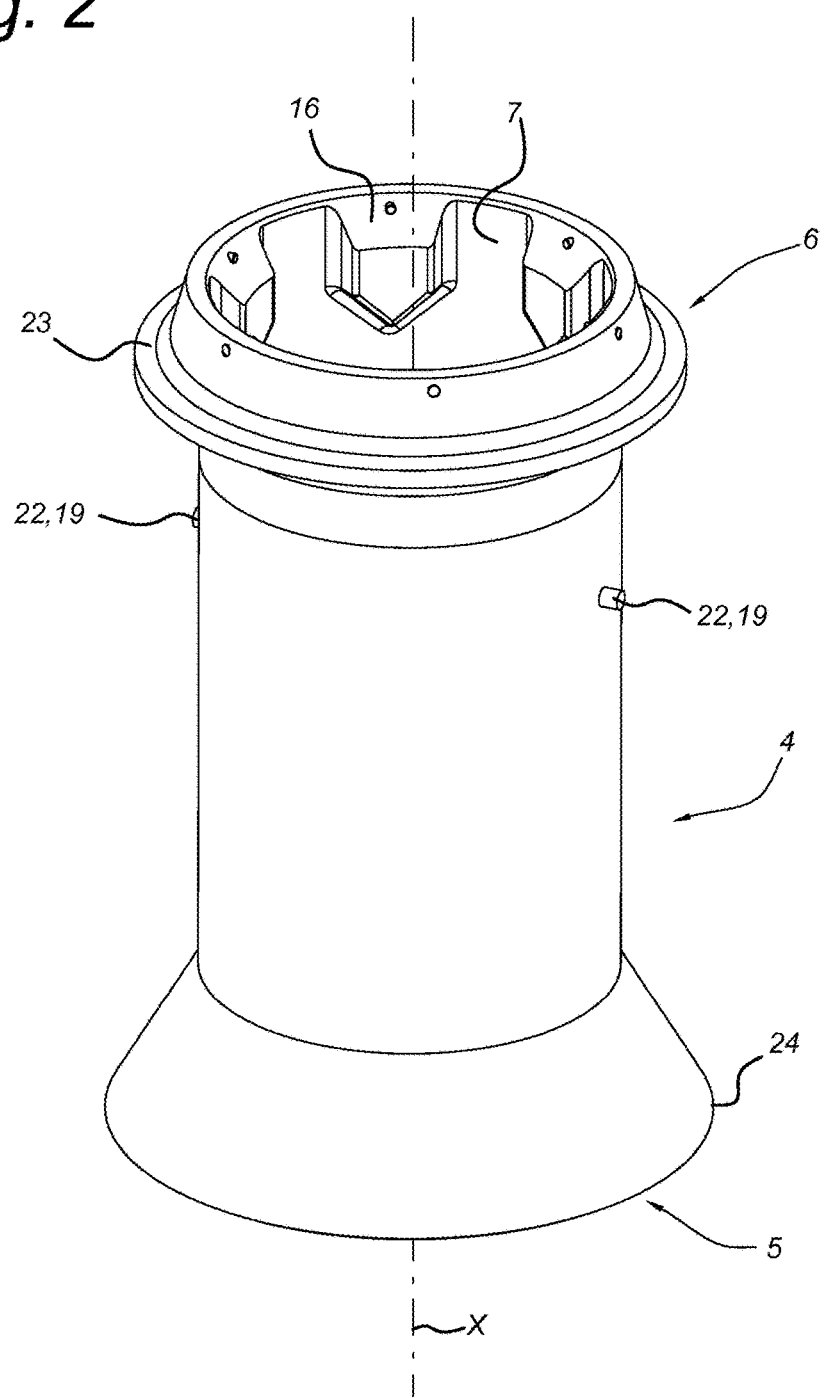
FIG. 2 shows a schematic perspective view of the tubular housing.
Figure 3:
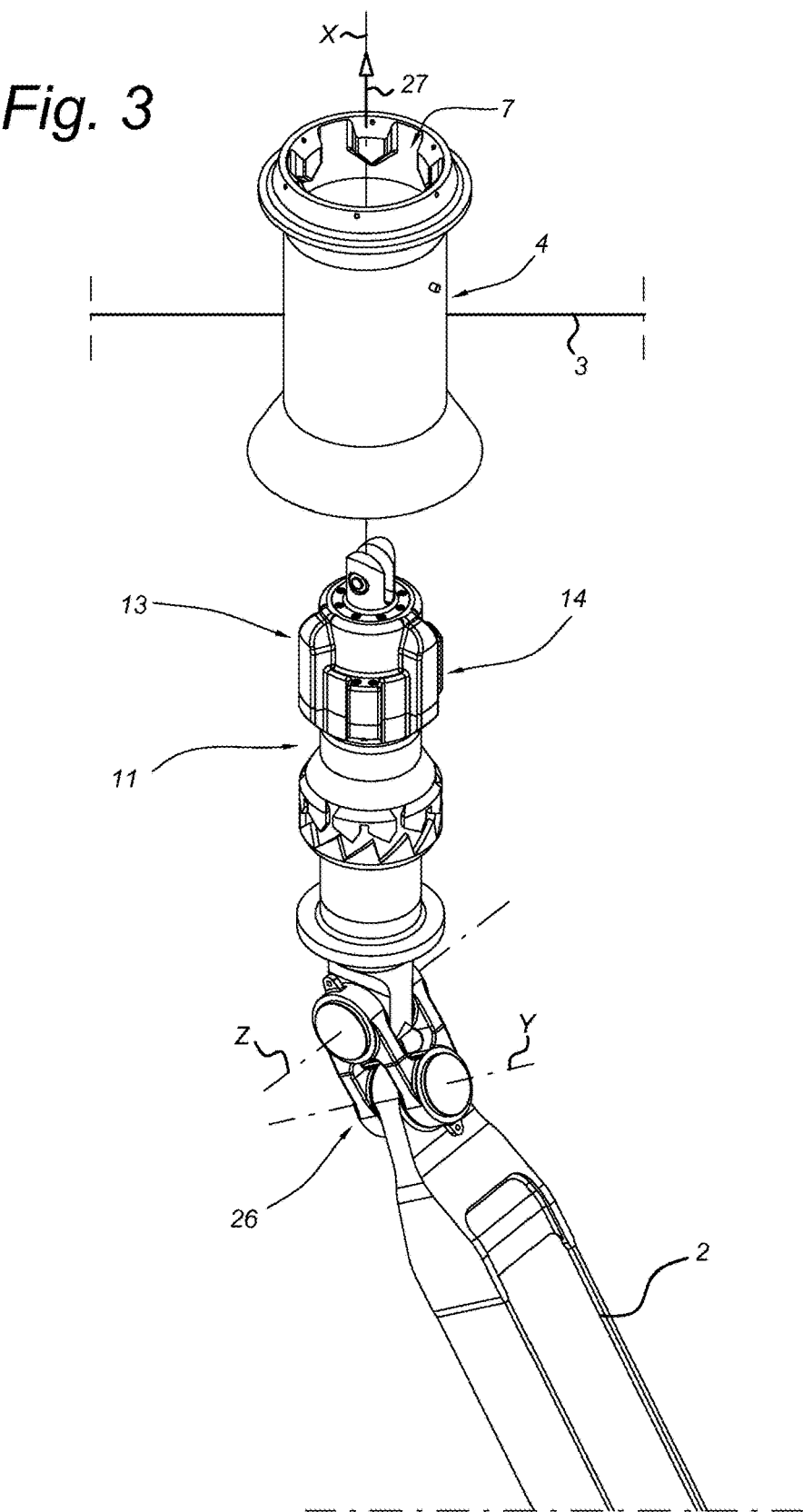
FIG. 3 shows the mooring line connector assembly in the first disconnected state.
Figure 4:
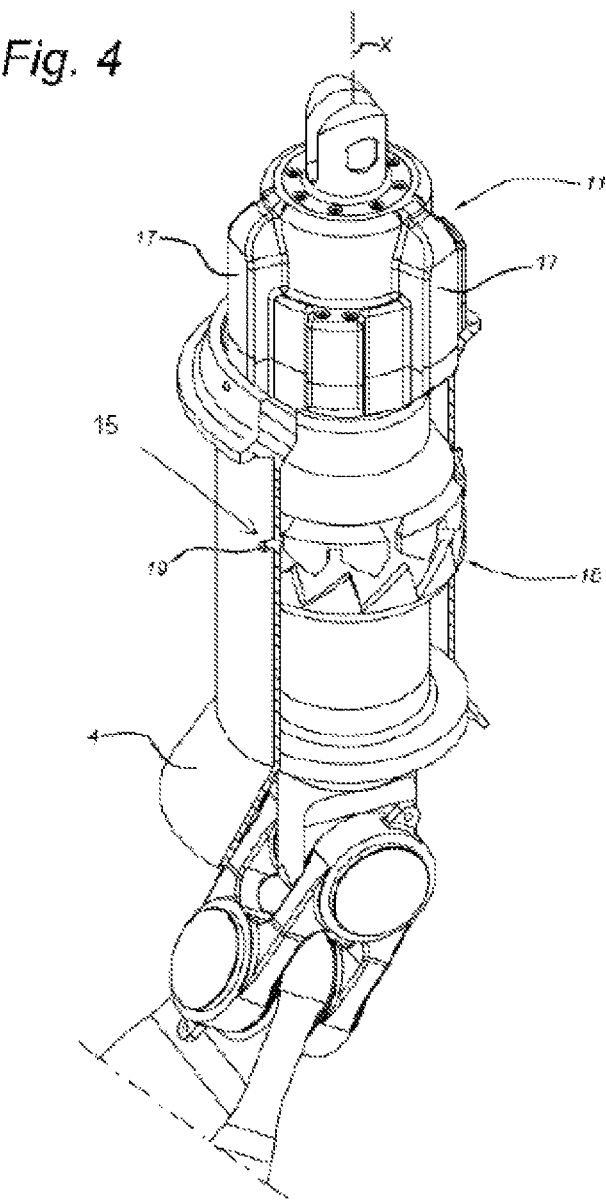
FIG. 4 shows the mooring line connector assembly in the second disconnected state.
Figure 5:
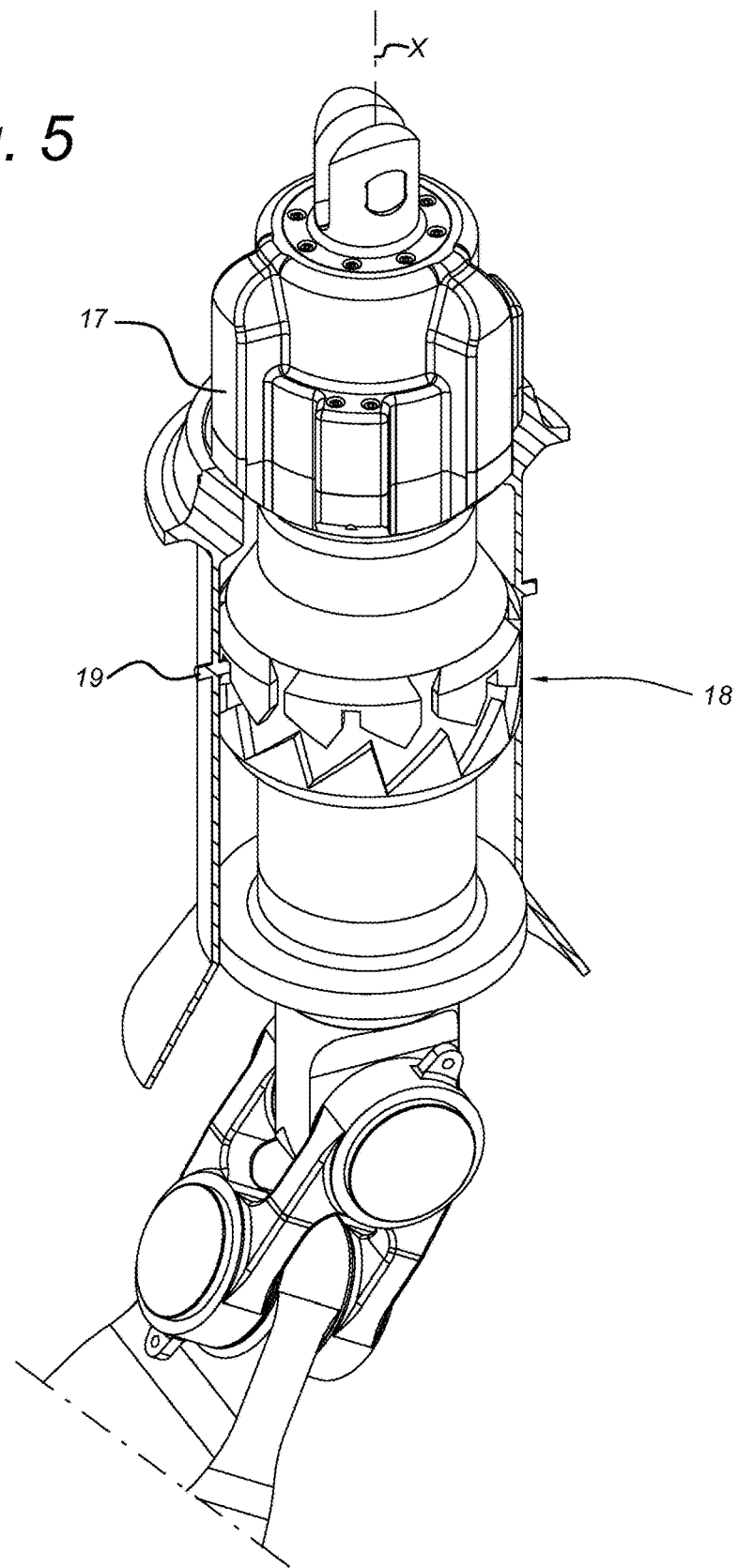
FIG. 5 shows the mooring line connector assembly in the connected state.

FIGS. 1-5 will be discussed in conjunction. FIGS. 4 and 5 show a perspective view of an assembled mooring line connector assembly 1 for connecting a mooring line 2 in the form of a chain 2 to a floating structure 3 (as shown in FIGS. 1 and 3), according to the invention. The chain 2 can also be a mooring leg, steel wire, composite line, or the like. In an assembled state, the assembly 1 comprises a tubular housing 4 (please refer to FIG. 2) connected to the floating structure 3, having a lower housing 5 end and an upper housing end 6 with an inner circumference 7. The assembly 1 further comprises a connector body 8, for instance in the form of a rod, extending along a connector axis X, having an upper connector body end 9 and a lower connector body end 10 connected to the mooring line 2. In addition, a guiding body 11 is provided rotatably arranged on the connector body 8 to be rotatable around the connector body 8 and the connector axis X. This feature is highly important for preventing unwanted chain torque during and after connection. First rotation means 12 are provided on an outer surface of the guiding body 11 and the guiding body 11 comprises a guiding part 13 having an outer circumference 14 at an upper guiding body end. As can be seen in FIGS. 4 and 5, second rotation means 15 are arranged on an inner surface of the tubular housing 4, arranged for engaging the first rotation means 12.

In the first disconnected state, as shown in FIG. 3, the first 12 and second 15 rotation means are disengaged and the inner 7 and outer 14 circumferences are configured to allow the outer circumference 14 of the guiding part 13 to be moved past the inner circumference 7 along the connector axis X in the direction of the floating structure 3 to enter the second disconnected state, as shown in FIG. 4.

In the second disconnected state the outer circumference 14 of the guiding part 13 is moved past the inner circumference 7 along the connector axis X in the direction of the floating structure 3, and the first 12 and second 15 rotation means engage each other and are configured to cause rotation of the guiding body 11 with respect to the tubular housing 4, around the connector axis X (and, effectively, around the connector body 8), when an axial force is exerted on the guiding body 11, in particular by the pull-in line 27, such as a chain, to enter the connected state, as shown in FIG. 5. In the connected state the first 12 and second 15 rotation means are configured to be locked with respect to each other, and the inner 7 and outer 15 circumferences are configured to prevent the outer circumference 15 of the guiding part 13 to be moved past the inner circumference 7 along the connector axis X, in a direction away from the floating structure 3, i.e. towards the seabed.

As shown in FIG. 1, the inner circumference 7 comprises radially inwardly extending protrusions 16, and the outer circumference 14 comprises radially outwardly extending protrusions 17. Therein, in the first disconnected state the inwardly 16 and outwardly extending protrusions 17 are configured to be misaligned along the connector axis X to allow the outwardly extending protrusions 17 to be moved past the inwardly extending protrusions 16 along the connector axis X when an axial force is exerted on the guiding body 11 in the direction of the floating structure 3 to enter the second disconnected state (through matching recesses defined between radially adjacent protrusions 16 and 17, respectively). In the connected state the inwardly 16 and outwardly 17 extending protrusions are configured to be aligned along the connector axis X to prevent the outwardly extending protrusions 17 to be moved past the inwardly extending protrusions 16 along the connector axis X when an axial force is exerted on the guiding body 11 in a direction away from the floating structure 3 (i.e. the inward protrusions 16 and outward protrusions 17 are abutting). The inwardly 16 and/or outwardly 17 extending protrusions are evenly spaced-apart in circumferential direction along the inner circumference 7, respectively outer circumference 14. The amount of inwardly 16 and/or outwardly extending protrusions 17 can be 4-8, preferably 6, as shown.

Figure 6:
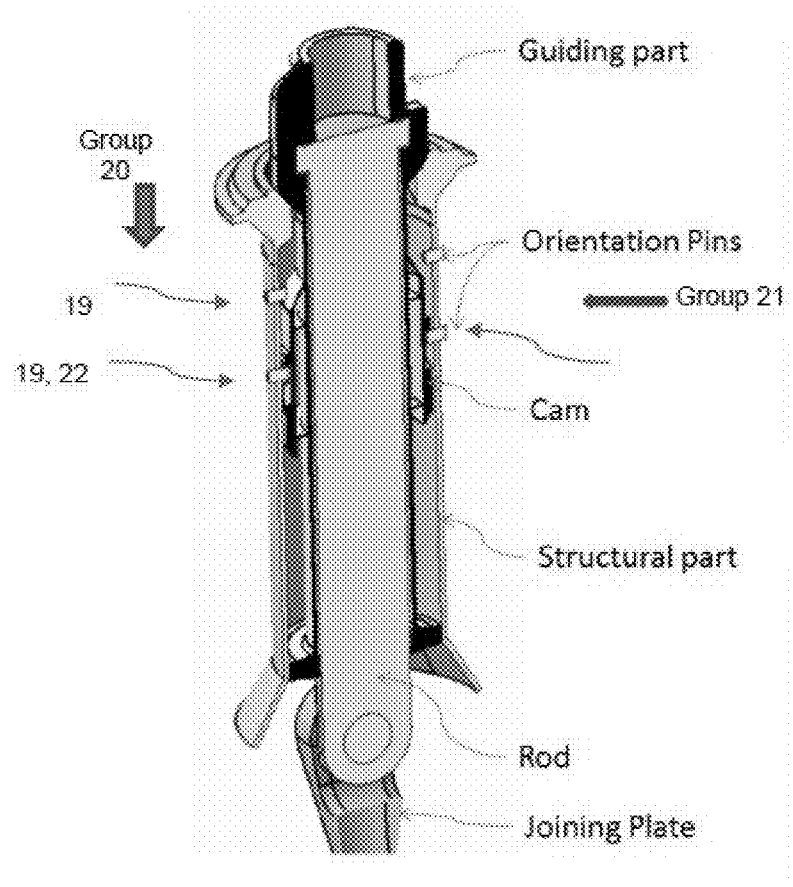
FIG. 6 shows an embodiment of the mooring line connector assembly in cross-section.

The first rotation means 12 comprise an outwardly protruding saw-tooth pattern 18 and the second rotation means 15 comprise one or more inwardly protruding orientation pins arranged for engaging the saw-tooth pattern 18. The orientation pins 19 'enter' the saw-tooth pattern 18 via appropriate vertical entrances in the upper region of the saw-tooth pattern 18. In the second disconnected state the saw-tooth pattern 18 is configured to allow the orientation pins 19 to be moved into and out of the saw-tooth pattern 18 along the connector axis X, and to allow the orientation pins 19 to rotate around the connector axis X along the saw-tooth pattern 18 when an axial force is exerted on the guiding body 11. In the connected state the saw-tooth pattern 18 is configured to lock the orientation pins 19, preventing the orientation pins 19 from rotating along the saw-tooth pattern 18, and along the connector axis X. The orientation pins 19 are evenly spaced-apart along the tubular housing 4 in circumferential direction. The orientation pins 19 comprise two groups 20, 21 of one or more radially opposing orientation pins 19, illustrated in FIG. 6. Each opposing group 20, 21 of orientation pins 19 comprises two orientation pins 19 spaced-apart along the connector axis X. The lower orientation pin 22 is arranged for moving into, and for being locked in, the saw-tooth pattern 18. The upper housing end 6 is provided with a radially outwardly protruding flange 23. The lower housing end 5 is provided with a conical flange 24 to facilitate entry of the guiding body 11 and connector body 8 into the tubular housing 4 in the direction of the floating structure 3. A lower guiding body end is provided with a disc-shaped radial support body 25 contacting the tubular housing 4 to transfer radial mooring line 3 forces to the tubular housing 4.

A pivoting arrangement 26 is arranged at the lower connector body end 10, connected to the mooring line 3. The pivoting arrangement 26 allows a first relative rotation of the mooring line 3 with respect to the lower connector body end 10 around a first rotational axis Y perpendicular to the connector axis X and a second relative rotation of the mooring line 3 around a second rotational axis Z being perpendicular to the connector axis X and the first rotational axis Y.

An associated floating structure 3 may comprise one or more of the aforementioned connector assemblies 1, for instance connected to a chain table of a buoy mooring system.

To provide a connection between the housing 4 (and, thus, the floating structure 3) and the guiding body 11, the following steps may be carried out: a pull-in line 27 is connected to the upper end 9 of the connector body 11 to pull the connector body 8 and the guiding body 11 towards the floating structure 3 through the tubular housing 4, in the axial direction, to enter the second disconnected state, wherein the first rotation means 12 engage the second rotation means 15 and the outer circumference 14 of the guiding part 13 is moved past the inner circumference 7. The pull-in line 27 is then used to exert an axial force on the guiding body 11 to cause the first 12 and second rotation means 15 to rotate with respect to each other, until the first 12 and second rotation means 15 are locked with respect to each other, and the inner 7 and outer 14 circumferences are preventing the outer circumference 14 of the guiding part 13 to be moved past the inner circumference 7 along the connector axis X, in a direction away from the floating structure 3, i.e. towards the seabed.

Thus, the invention has been described by reference to the embodiments discussed above. It will be recognized that the embodiments are susceptible to various modifications and alternative forms well known to those of skill in the art without departing from the spirit and scope of the invention. Accordingly, although specific embodiments have been described, these are examples only and are not limiting upon the scope of the invention.

REFERENCE NUMERALS

1. Mooring line connector assembly
2. Mooring line (chain)
3. Floating structure
4. Tubular housing
5. Lower housing end
6. Upper housing end
7. Inner circumference of upper housing end
8. Connector body
9. Upper connector body end
10. Lower connector body end
11. Guiding body
12. First rotation means
13. Guiding part
14. Outer circumference of upper guiding body end
15. Second rotation means
16. Radially inwardly extending protrusions
17. Radially outwardly extending protrusions
18. Saw-tooth pattern
19. Orientation pin
20. First group of orientation pins
21. Second group of orientation pins
22. Lower orientation pin
23. Radially outwardly protruding flange
24. Conical flange at lower housing end
25. Radial support body
26. Pivoting arrangement
27. Pull-in line
X=connector axis
Y=rotational axis perpendicular to X
Z=rotational axis perpendicular to Y and Z

The invention claimed is:

1. A mooring line connector assembly for connecting a mooring line to a floating structure, the mooring line connector assembly comprising:
a tubular housing mountable on the floating structure, the tubular housing having a lower housing end and an upper housing end with an inner circumference, the inner circumference comprising radially inwardly extending protrusions at the upper housing end;
a connector body extending along a connector axis, the connector body having an upper connector body end and a lower connector body end connected to the mooring line;
a guiding body extending along and rotatably disposed around the connector body between the upper connector body end and the lower connector body end to be freely rotatable around the connector body and the connector axis, the guiding body comprising an outwardly-protruding saw tooth pattern on an outer surface of the guiding body and a guiding part having an outer circumference at an upper guiding body end, the outer circumference comprising radially outwardly extending protrusions, the tubular housing being disposed coaxial with the connector axis and surrounding the guiding body; and
at least one orientation pin disposed on an inner surface of the tubular housing and configured to engage the outwardly-protruding saw tooth pattern on the outer surface of the guiding body,
wherein
in a first disconnected state, the outwardly-protruding saw tooth pattern and the at least one orientation pin are disengaged and the inner and outer circumferences are configured to allow the outer circumference of the guiding part to be moved past the inner circumference of the upper housing end along the connector axis in the direction of the floating structure from the lower housing end to the upper housing end to enter
a second disconnected state, in which the outer circumference of the guiding part at the upper guiding body end is moved through the inner circumference of the upper housing end and beyond the upper housing end along the connector axis in the direction of the floating structure, and in which the outwardly-protruding saw tooth pattern and the at least one orientation pin engage each other and are configured to cause rotation of the guiding body with respect to the tubular housing, around the connector body and the connector axis, when an axial force is exerted on the guiding body, to enter
a connected state, in which the outwardly-protruding saw tooth pattern and the at least one orientation pin are configured to be locked with respect to each other, and in which the radially inwardly extending protrusions and the radially outwardly extending protrusions are configured to prevent the outer circumference of the guiding part to be moved past the inner circumference of the upper housing end along the connector axis, in a direction away from the floating structure.

2. The mooring line connector assembly according to claim 1, wherein
in the first disconnected state, the inwardly and outwardly extending protrusions are configured to be misaligned along the connector axis to allow the outwardly extending protrusions to be moved past the inwardly extending protrusions along the connector axis when an axial force is exerted on the guiding body in the direction of the floating structure to enter the second disconnected state.

3. The mooring line connector assembly according to claim 2, wherein the inwardly and/or outwardly extending protrusions are evenly spaced-apart in a circumferential direction along the respective inner circumference and outer circumference.

4. The mooring line connector assembly according to claim 2, wherein the amount of inwardly and/or outwardly extending protrusions is 4-8.

5. The mooring line connector assembly according to claim 4, wherein the amount of inwardly and/or outwardly extending protrusions is 6.

6. The mooring line connector assembly according to claim 1, wherein the at least one orientation pin is an inwardly protruding orientation pin configured to engage the saw-tooth pattern,
wherein
in the second disconnected state, the saw-tooth pattern is configured to allow the at least one orientation pin to be moved into and out of the saw-tooth pattern along the connector axis, and to allow the at least one orientation pin to rotate around the connector axis along the saw-tooth pattern when an axial force is exerted on the guiding body, and
in the connected state, the saw-tooth pattern is configured to lock the at least one orientation pin, preventing the at least one orientation pin from rotating along the saw-tooth pattern, and along the connector axis.

7. The mooring line connector assembly according to claim 6, wherein the orientation pin comprises a plurality of orientation pins are evenly spaced-apart along the tubular housing in circumferential direction.

8. The mooring line connector assembly according to claim 7, wherein the orientation pins comprise two groups of one or more radially opposing orientation pins.

9. The mooring line connector assembly according to claim 8, wherein each opposing group of orientation pins comprises two orientation pins spaced-apart along the connector axis, and
wherein the lower orientation pin is arranged for moving into, and for being locked in, the saw-tooth pattern.

10. The mooring line connector assembly according to claim 1, wherein the upper housing end is provided with a radially outwardly protruding flange.

11. The mooring line connector assembly according to claim 1, wherein the lower housing end is provided with a conical flange to facilitate entry of the guiding body and connector body into the tubular housing in the direction of the floating structure.

12. The mooring line connector assembly according to claim 1, wherein a lower guiding body end is provided with a radial support body contacting the tubular housing to transfer radial mooring line forces to the tubular housing.

13. The mooring line connector assembly according to claim 1, wherein a pivoting arrangement is arranged at the lower connector body end, connected to the mooring line, the pivoting arrangement allowing a first relative rotation of the mooring line with respect to the lower connector body end around a first rotational axis perpendicular to the connector axis and a second relative rotation of the mooring line around a second rotational axis being perpendicular to the connector axis and the first rotational axis.

14. The mooring line connector assembly according to claim 1, wherein the outwardly-protruding saw tooth pattern is provided in the form of a cam.

15. The mooring line connector assembly according to claim 1, wherein in the connected state, the connector body is rotatable around the connector axis with respect to the tubular housing.

16. A floating structure comprising:
one or more mooring line connector assemblies according to claim 1.

17. The floating structure according to claim 16, wherein the one or more mooring line connector assemblies are connected to a chain table of a buoy mooring system.

18. A method for connecting a mooring line to a floating structure using the mooring line connector assembly according to claim 1, the method comprising:
using a pull-in line connected to the upper end of the connector body to pull the connector body and the guiding body towards the floating structure through the tubular housing, in the axial direction, to enter the second disconnected state, in which the outwardly-protruding saw tooth pattern engages the at least one orientation pin and the outer circumference of the guiding part is moved past the inner circumference; and
using the pull-in line to exert an axial force on the guiding body to cause the outwardly-protruding saw pattern and the at least one orientation pin to rotate with respect to each other, until the outwardly-protruding saw pattern and the at least one orientation pin are locked with respect to each other, and the inner and outer circumferences are preventing the outer circumference of the guiding part to be moved past the inner circumference along the connector axis, in a direction away from the floating structure.

* * * * *